Aug. 16, 1960 M. T. WEISS 2,949,588
NON-RECIPROCAL GYROMAGNETIC DEVICE
Filed Dec. 13, 1954

INVENTOR
M. T. WEISS
BY *Roy M. Porter Jr.*
ATTORNEY

United States Patent Office 2,949,588
Patented Aug. 16, 1960

2,949,588

NON-RECIPROCAL GYROMAGNETIC DEVICE

Max T. Weiss, Elizabeth, N.J., assignor to Bell Telephone Laboratories, Incorporated, New York, N.Y., a corporation of New York Filed Dec. 13, 1954, Ser. No. 474,693

4 Claims. (Cl. 333—24)

This invention relates to improved non-reciprocal gyromagnetic components for electromagnetic wave transmission systems and more particularly to non-reciprocal attenuating devices or isolators operating upon the principles of gyromagnetic resonance.

It has been proposed to place an element of gyromagnetic material, such as ferrite, in the path of and asymmetrically in the field pattern of electromagnetic wave energy and to bias this material to a point at which it becomes resonant in a gyromagnetic sense to the frequency of applied wave energy. When microwaves propagating in one direction are applied to such a path, they are greatly attenuated, but when they are propagating in the other direction, little or no attenuation is observed. Such devices are known in the art as isolators. In devices employing the specific gyromagnetic material of normal ferrite, the resonant frequency increases directly with the strength of the biasing magnetic field. Therefore, the maximum practical obtainable field strength becomes the limiting value upon the highest frequency at which resonance is obtainable. Furthermore, the variability of the strength of this field is the only control upon the frequency of resonance, and this limitation restricts the application of resonance devices.

It is therefore an object of the present invention to extend the operating frequency range of gyromagnetic devices that is possible with practically obtainable biasing magnetic field strengths beyond that possible by the use of normal ferrites.

It is another object to vary the frequency of operation of gyromagnetic devices operating with fixed biasing magnetic fields.

It is a further object to decrease the dependence of gyromagnetic resonance devices upon the precise strength of the biasing magnetic field.

In accordance with the present invention, it has been found that materials of the types including oriented polycrystalline barium iron oxide of the composition known commonly by the trade name Ferroxdure have resonant frequencies which depend not only upon the strength of the biasing magnetic field, but also, in a very important way, upon the orientation of this field to the axes of orientation of the crystallites of the material. When the orientation of the field is perpendicular to the axes of the crystallites, the resonant frequency decreases from a specific initial frequency with increase in field. When the orientation of the field is parallel to the axes of the crystallites, the resonant frequency increases from the initial frequency with increase in field. Between these extremes are a family of curves representing resonant frequencies over a wide frequency range that are dependent upon both the orientation of the applied biasing field and upon its strength. This provides operating values in a range not heretofore obtainable with normal ferrites, and it also makes possible a large range of resonant frequencies with a given biasing field strength. Furthermore, it is characteristic of certain orientations between the specified extremes that the resonant frequency is substantially constant with respect to variations in the strength of the biasing field. Operation in this range therefore provides unusual independence from the exact strength of the biasing magnetic field.

These and other objects, the nature and features of the present invention, and its advantages will appear more fully upon consideration of the illustrated embodiment shown in the following drawings in which.

Figure 1:
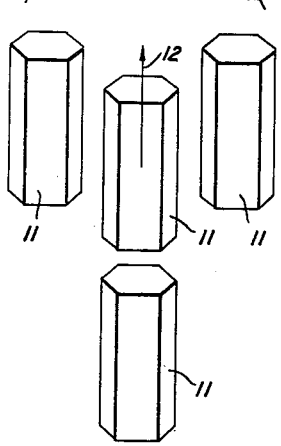
Fig. 1 is a schematic diagram showing the aligned condition of a plurality of crystallites in accordance with the invention.

Referring more specifically to Fig. 1, a schematic representation of the aligned crystal structure of the compound Ferroxdure is shown. It represents a class of sintered ceramic, oxidic, magnetically hard materials having the usual composition of $BaFe_{12}O_{19}$, $BaFe_{18}O_{27}$ or other such compounds. In Fig. 1, crystals 11 represent individual single crystallites being generally hexagonal crystal structures. Each crystal 11 has an hexagonal axis defined as that axis perpendicular to the parallel faces of the crystal and also as that axis representing the easy direction of magnetization. A complete discussion of this class of compounds and their general physical and chemical properties is to be found in an article "Ferroxdure, a Class of New Permanent Magnet Materials" by Went, Rathenau, Gorter and Oosterhout, Philips Technical Review, January 1952, pages 194–208, and in the article "Saturation and Magnetization of Hexagonal Iron Oxide Compounds" by Rathenau, Reviews of Modern Physics, January 1953, pages 297–301. One application of material of this type is disclosed in an article "Faraday-Effect in Magnetic Materials with Traveling and Standing Waves" by Beljers, Philips Research Report 9, pages 131–139, April 1954.

In accordance with the invention the hexagonal axes of crystallites 11 are each aligned in a single direction as represented by the vector 12 on Fig. 1. This orientation can be accomplished by grinding the iron oxide material to a fine powder and placing the powder in a mold in a strong magnetic field. The magnetic field lines up the uniaxial or hexagonal axes of the individual crystallites relative to the direction of the field so that all crystallites are oriented on the same, single direction. Then the oriented powder is pressed together under force and sintered according to conventional metallurgical practices to form a solid material. Once produced, the orientation is not destroyed or affected by the subsequent pressing and sintering processes and thereafter is unaffected by further application of magnetic fields. This material will hereinafter be referred to as oriented Ferroxdure.

Figure 2:
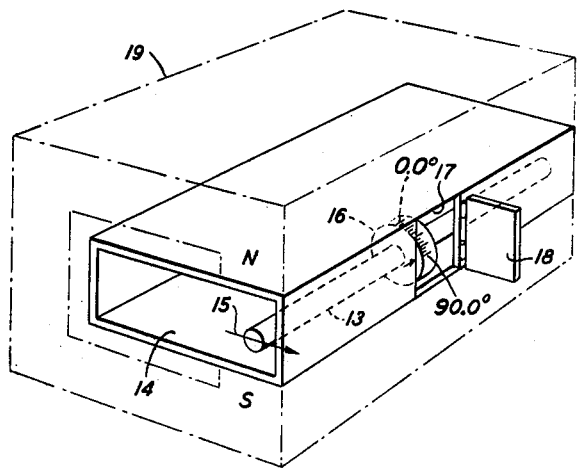
Fig. 2 is a pictorial representation of an isolator in accordance with the invention employing an axially rotatable element of the material of Fig. 1.

In Fig. 2 an elongated member 13 of oriented Ferroxdure is disposed in a conductively bounded rectangular wave guide 14. The single axis of crystal orientation represented by vector 15 of member 13 is perpendicular to the direction of elongation of member 13, which is in turn parallel to the direction of propagation of wave energy in guide 14. Member 13 is suitably supported in guide 14 so that it may be rotated about its longitudinal axis at least over a range of 90 degrees. As shown in Fig. 2, rotating and supporting means is provided by a hollow cylinder 16 of material having substantially unity dielectric constant through which member 13 extends. Cylinder 16 extends next to an aperture 17 in the narrow wall of guide 14 through which access is provided to cylinder 16 to rotate it and thereby to provide the desired rotation of member 13. The circumference of cylinder 16 may be calibrated in degrees of rotation by markings which are visible through aperture 17. A flap 18 is provided to close aperture 17 between adjustments.

Member 13 is biased by a suitable magnetic field applied perpendicular to the direction of propagation of wave energy in guide 14. By way of illustration, this field is shown as supplied by a permanent magnet 19 having its respective pole pieces N and S bearing against the top and bottom wide walls of guide 14 and extending longitudinally therealong over the extent of member 13 within guide 14. The calibrations on cylinder 16 are such that an angle is measured between the axis 15 of member 13 and the direction of the applied magnetic field. This angle is zero when the axis 15 is parallel to the direction of the field and 90 degrees when perpendicular to the direction of the field. This field may be supplied by a magnetic structure of other suitable physical shape or by an electrical solenoid.

Member 13 is located asymmetrically in the cross section of guide 14 in accordance with the teachings of W. H. Hewitt in his copending application, Serial No. 362,191, filed June 17, 1953, and S. E. Miller, Serial No. 362,193, filed June 17, 1953. This places member 13 at a position of circular polarization of the components of the high frequency magnetic field of wave energy in guide 14 that rotate clockwise for one direction of propagation through guide 14 and rotate counterclockwise for propagation in the opposite direction. As is thoroughly disclosed in the above mentioned copending applications with reference to normal ferrites, the gyrating electrons in the material will couple strongly with the high frequency magnetic field rotating in one direction but will be substantially unaffected by the field rotating in the opposite direction. Accordingly, there will be substantial differences in observed characteristics for the two directions of propagation.

When the frequency of the high frequency energy is equal to the natural resonant frequency of the gyrating electrons for a given biasing magnetic field, the loss or attenuation characteristic is maximum. This is referred to as the condition of gyromagnetic resonance. For all field strengths other than that required for resonance the attenuation will be small. The resonance effect and its associated attenuation is a characteristic of the material and the applied biasing magnetic field. The non-reciprocal nature of the attenuation is a function of the asymmetrical location of the material in the field pattern of the wave energy. In addition, at field strengths other than that required for resonance, the gyrating electrons produce a phase shift and field displacement which is non-reciprocal in character as disclosed in the above mentioned copending application of S. E. Miller and his copending application, Serial No. 371,437, filed July 31, 1953, now Patent 2,849,683, August 26, 1958.

Figure 3:
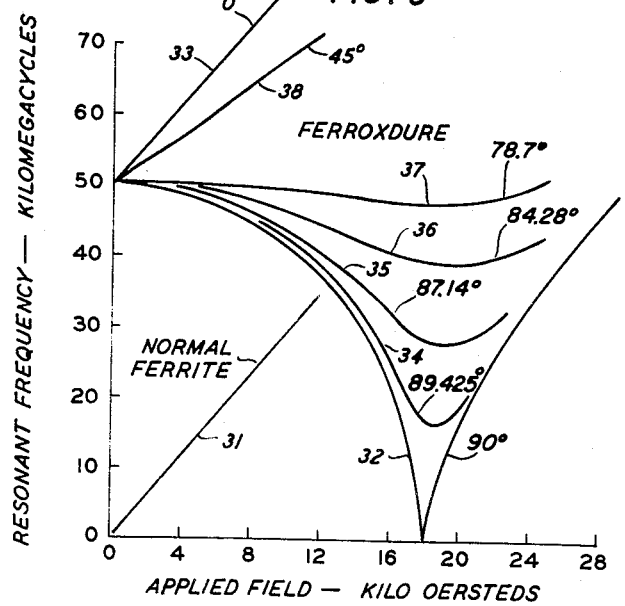
Fig. 3 shows the characteristic of the resonant frequency versus biasing field strength for a plurality of orientations in the embodiment of Fig. 1.

The resonance frequency and therefore the attenuating frequency versus the applied field of normal ferrite structures is represented by curve 31 on Fig. 3. It is noted that the resonant frequency increases linearly as the applied field is increased. A practical maximum is reached at something less than a field strength of fifteen kilooersteds and a frequency of forty-two kilomegacycles. In accordance with the invention, the range of resonant frequencies, and therefore the frequencies at which nonreciprocal attenuation may be produced, are substantially extended by the use of oriented Ferroxdure. In the Ferroxdure, however, unlike normal ferrites, the gyromagnetic resonance depends upon the orientation of the hexagonal axes of the crystallites of the Ferroxdure with respect to the direction of the applied field. The resulting resonance characteristics are shown on Fig. 3 by a family of curves. Curve 32 represents the variation of the resonant frequency with the applied field when the hexagonal axis of the material is perpendicular to the applied field, i.e., when the calibration on cylinder 16 of Fig. 2 is 90 degrees. It is noted that the resonant frequency decreases with increase in applied field, this being substantially opposite to the variation exhibited by normal ferrite, reaches a minimum at a field strength of substantially eighteen kilooersteds and again increases. At the other extreme, when the hexagonal axis of the material is parallel to the applied field, i.e., a reading of zero degrees on the calibrations of cylinder 16, the resonant frequency increases with applied field at substantially the same rate of increase as is exhibited by normal ferrite starting, however, from a point of origin in the range of substantially fifty kilomegacycles. This characteristic is represented by curve 33 on Fig. 3. Between these extremes curves 34 through 38 represent the respective characteristics of resonant frequency versus the applied field for angles of inclination away from parallel of 89.425 degrees, 87.14 degrees, 84.28 degrees, 78.7 degrees and 45 degrees, respectively. The characteristics of oriented Ferroxdure as represented by these curves differ from the characteristics of normal ferrite as shown by curve 31 because of the uniaxial nature of Ferroxdure and because of its high magnetic anisotropy.

These characteristics are utilized in the embodiment of Fig. 2 by rotating member 13 about its longitudinal axis to change the angle of inclination between its crystal axis 15 and the applied field. Operation as a resonant frequency attenuator may be shifted from curve to curve and, therefore, from frequency to frequency, between the extremes represented by curves 32 and 33 without change in the biasing magnetic field strength. Thus the embodiment of Fig. 2 becomes a non-reciprocal frequency variable selective attenuator. By operating with certain intermediate inclinations, such as the one represented by curve 37, substantial independence is obtained from the exact strength of the applied field.

In all cases it is understood that the above described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In an electromagnetic wave transmission system, a conductively bounded wave guiding structure for supporting electromagnetic wave energy of a given high frequency, an element of polycrystalline ferrite material of hexagonal crystal structure disposed in said wave guiding structure, each of said crystallites having the single hexagonal axis thereof coincident with the easy direction of magnetization thereof and being oriented so that the axis of each crystallite extends parallel to each other in a direction perpendicular to the direction of propagation of said wave energy, and means for applying a biasing magnetic field to said element perpendicular to said direction of propagation and with an angle that is greater than 70 degrees and not greater than 90 degrees between said crystal axes and said field.

2. The combination of claim 1 wherein the crystal axis of said element is aligned perpendicular to said magnetic field.

3. The combination of claim 1 wherein the crystal axis of said element is aligned at an acute angle to said magnetic field.

4. The combination of claim 2 wherein the crystal axis of said element is rotatable with respect to said magnetic field.

(References on following page)

References Cited in the file of this patent

Snoek: "Gyromagnetic Resonance in Ferrites," Nature, July 19, 1947, vol. 160, page 90.

Kales et al.: "A Nonreciprocal Component," Journal of Applied Physics, June 1953, vol. 24, No. 6.

Wijn: "A New Method of Melting Ferromagnetic Semiconductors," Nature, October 25, 1952, vol. 170, pages 707–708.

Bickford: Physical Review, vol. 78, May 1950, pages 449–457.

Went: "Ferroxdure," Phillips Tech. Review, vol. 13, No. 7, 1952, pages 194–97.

Rathenau: Review of Modern Physics, vol. 25, No. 1, January 1953, pages 297 through 301.

Landau et al.: "On the Theory of the Dispersion of Magnetic Permeability in Ferromagnetic Bodies," Physikalische Zeitshrift der Sowjetunion, vol. 8, 1935, pages 153–169.